United States Patent [19]

Nakamura

[11] Patent Number: 5,793,856
[45] Date of Patent: Aug. 11, 1998

[54] SWITCH SYSTEM FOR SWITCHING EXTENSION NUMBERS

[75] Inventor: Hiroko Nakamura, Kawasaki, Japan

[73] Assignee: Fujitsu Limited, Kanagawa, Japan

[21] Appl. No.: 706,980

[22] Filed: Sep. 3, 1996

Related U.S. Application Data

[63] Continuation of Ser. No. 225,969, Apr. 8, 1994, abandoned.

[30] Foreign Application Priority Data

Apr. 20, 1993 [JP] Japan .................................. 5-117710

[51] Int. Cl.$^6$ .................................................. H04M 3/00
[52] U.S. Cl. ........................ 379/201; 379/165; 379/242; 379/245
[58] Field of Search ........................ 379/156, 157, 379/165, 177, 201, 204, 207, 210, 211, 212, 213, 220, 221, 242, 243, 244, 245, 246

[56] References Cited

U.S. PATENT DOCUMENTS

| | | | |
|---|---|---|---|
| 4,754,479 | 6/1988 | Bicknell et al. | 379/207 |
| 4,755,985 | 7/1988 | Jayapalan | 379/245 |
| 4,899,373 | 2/1990 | Lee et al. | 379/207 |
| 4,933,967 | 6/1990 | Lo et al. | 379/245 |
| 4,956,861 | 9/1990 | Kondo | 379/211 |
| 4,959,856 | 9/1990 | Bischoff et al. | 379/245 |
| 5,200,996 | 4/1993 | Beierle | 379/210 |
| 5,309,504 | 5/1994 | Morganstein | 379/214 |
| 5,392,340 | 2/1995 | Otsuka | 379/211 |
| 5,469,501 | 11/1995 | Otsuka | 379/211 |
| 5,513,256 | 4/1996 | Komuro | 379/156 |
| 5,541,992 | 7/1996 | Tsuzuki et al. | 379/233 |

*Primary Examiner*—Krista Zele
*Assistant Examiner*—Scott L. Weaver
*Attorney, Agent, or Firm*—Helfgott & Karas, P C.

[57] ABSTRACT

A switch system for switching extension numbers, which can be changed by a subscriber having the extension number of the BBG (Basic Business Group) without the operation by a switch operator, is connected with a plurality of telephone sets (TEL) which belong to the BBG (Basic Business Group). An access code and an extension number are sent from one telephone set of the BBG to the switch. A former extension number of the one telephone set is deleted by the switch system and is registered in the switch to change the former extension number of the one telephone set to the extension number sent from the one telephone set. The switch system has a subscriber circuit section, a digital switch module and a central processing section including a central processor, a main memory and a file memory. The file memory has memory areas of a telephone number exchanging table which stores outline numbers (DN), a LEN index table that stores LENs (subscriber line position information), and a subscriber information table which stores subscriber data (SD). Each of the LENs is extracted by an outline number as an address and each of the subscriber data is extracted by a LEN as an address.

3 Claims, 20 Drawing Sheets

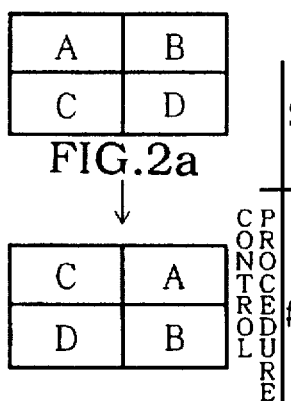
FIG.2a
↓
FIG.2b
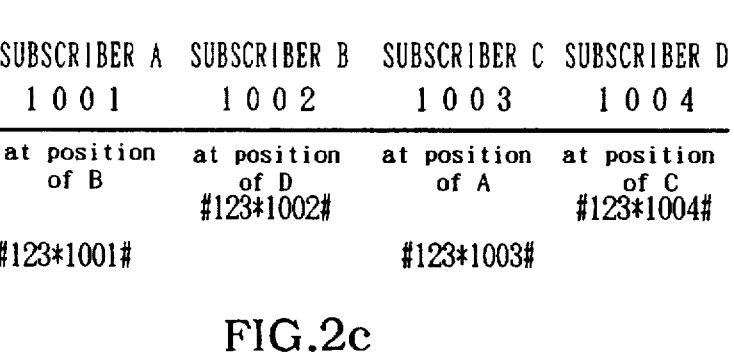
FIG.2c
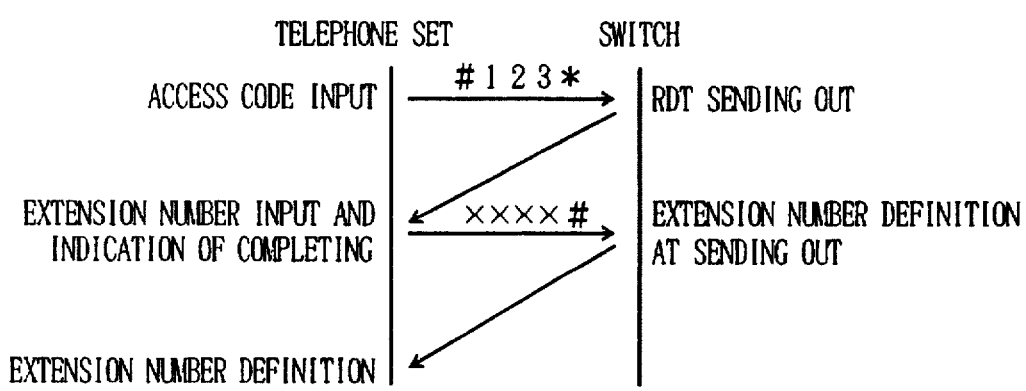
FIG.2d

| | | SUBSCRIBER A<br>1 0 0 1 | SUBSCRIBER B<br>1 0 0 2 | SUBSCRIBER C<br>1 0 0 3 | SUBSCRIBER D<br>1 0 0 4 |
|---|---|---|---|---|---|
| CONTROL | PROCEDURE | at position<br>of D<br><br>#333*1001# | at position<br>of C<br><br>#333*1002# | at position<br>of A<br><br>#333*1003# | NOTHING |
| | | Change to<br>1004 → 1001<br>1001 → 1004 | Change to<br>1003 → 1002<br>1002 → 1003 | Change to<br>1004 → 1003<br>1003 → 1004 | |

F I G. 1 4
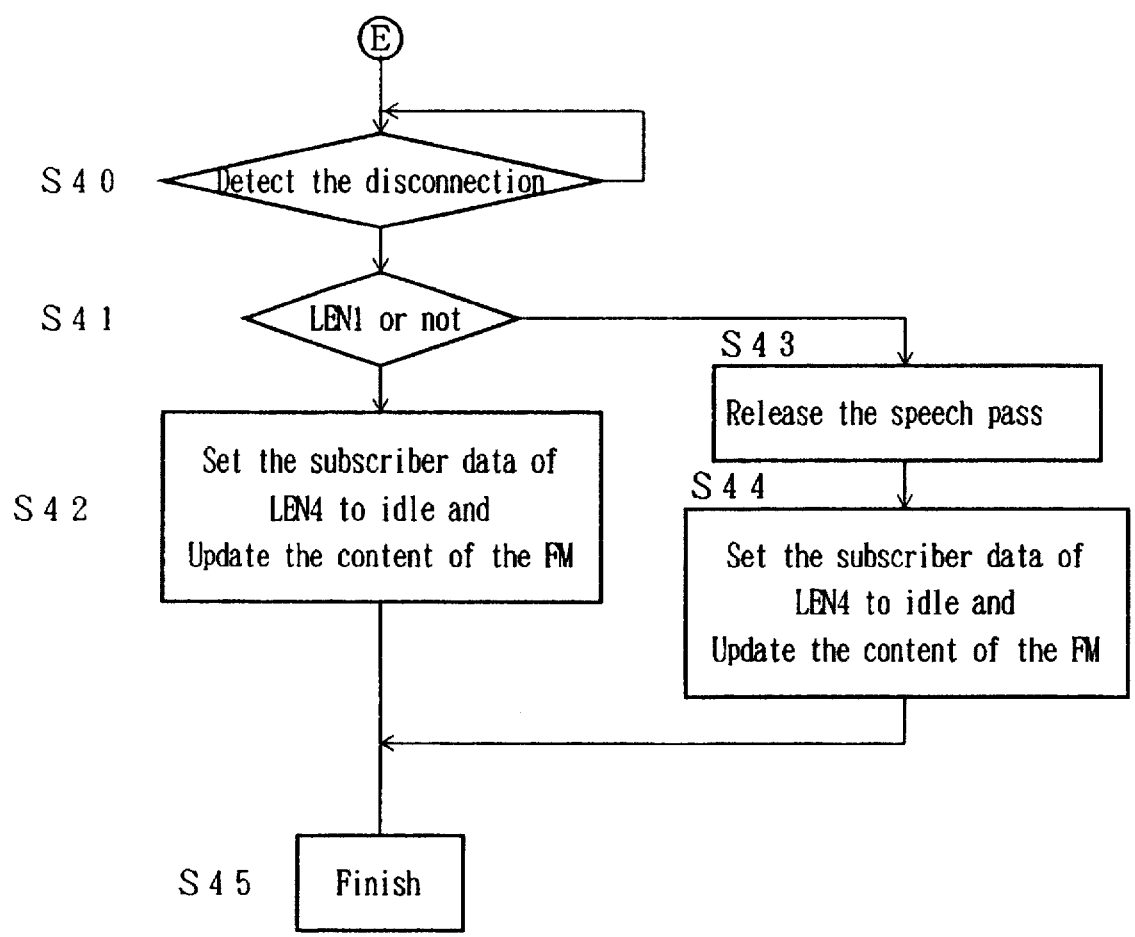

SWITCH SYSTEM FOR SWITCHING EXTENSION NUMBERS

This is a continuation of application Ser. No. 08/225,969, filed Apr. 8, 1994, now abandoned.

BACKGROUND OF THE INVENTION

1. Field of the Invention

The present invention relates to a method and device for switching an extension number and a telephone switch using the method and device. More particularly, it relates to a method and device for changing an extension number in a telephone switch which is connected with a plurality of telephone sets which belong to a virtual private network, which is called a CENTREX or BBG (Basic Business Group) and is similar to a system where a PBX is connected to an office switch.

2. Related Prior Art

A group subscribing in the above-described BBG can define (or allocate) an extension number freely in each line of the group (BGL: BUSINESS GROUP LINE). However, according to a conventional method, it is required for defining and changing the extension number to be operated by the operator of the office switch each time.

That is, it becomes necessary to define and change the extension number in the case where, for example, changing seat positions and the like is performed in the group. In this case, the data for establishing the relation of the extension number defined newly, the terminal (telephone set) intended for changing the extension number and the old extension number used till then must be prepared at first in the conventional method and device. Next, the data must be presented to the operator who administrates the telephone numbers.

And the operator changes the extension number by inputting the commands to the switch based on the above-described data. Then, it is required to input the modified commands as the same number as the number of subscribers for changing. When the operation by the operator of the office switch is finished and the notification shown that the operation is finished is given to the BBG group, it becomes possible to carry out with the extension numbers changed newly and defined.

As the above-described, it is required for changing the extension number, that is, for making new number plan available to take the steps by the switch operator other than subscribers who subscribe in the BBG in the conventional method. Further, as it takes much time to do, it causes inconvenience on the telephone sets of BBG subscribers until the new number plan becomes available from the old number plan.

SUMMARY OF THE INVENTION

It is therefore an object of the present invention to provide a method and system for changing or switching an extension number assigned to one of plural telephone sets provided with a virtual private network to solve inconveniences presented in the conventional method.

A further object of the present invention is to provide a method for switching an extension number, which can be defined by a subscriber having the extension number in a virtual private network or the BBG (Basic Business Group).

A still further object of the present invention is to provide a method in a telephone switch providing plural telephone sets (TEL) with a virtual private network for switching an extension number between the plural telephone sets.

A further object of the present invention is to provide a switch system connected with plural telephone sets (TEL) provided with a virtual private network for switching an extension number between the plural telephone sets.

A further object of the present invention is to provide a method comprising the steps of sending an access code and an extension number from one telephone set of the virtual private network to the switch, deleting a former extension number of the one telephone set by the switch; and registering in the switch to change the former extension number of the one telephone set to the extension number sent from the one telephone set.

A still further object of the present invention is to provide a switch system comprising a subscriber circuit section, a digital switch module and a central processing section including a central processor, a main memory and a file memory, said file memory having memory areas of a telephone number exchanging table that stores outline numbers (DN), a LEN index table that stores LENs (subscriber line position information) and a subscriber information table that stores subscriber data (SD), wherein each of the outline numbers (DN) is extracted by an extension number as an address, each of the LENs is extracted by an outline number as an address and each of the subscriber data is extracted by a LEN as an address.

Other objects and advantages of the present invention will become apparent from the detailed description to follow taken in conjunction with the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention:

FIG. 2A–2D is an explanatory diagram showing the operation outline of the present invention (No. 1).

FIG. 14 is an operation flow of the connection of extension line (No. 5).

DESCRIPTION OF THE PREFERRED EMBODIMENTS

Figure 1A:
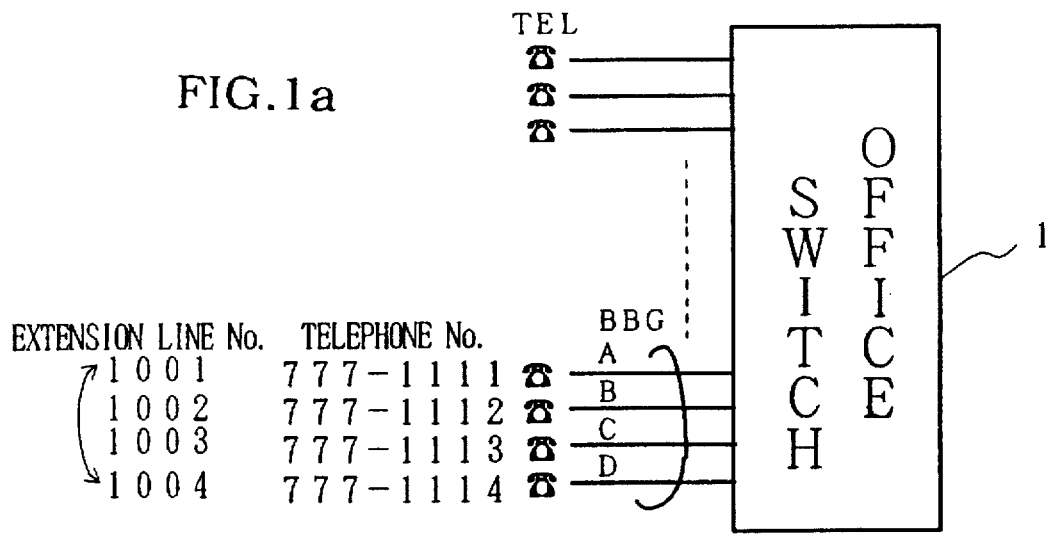
FIG. 1A–1B is an explanatory diagram of the applied example of the present invention.
Figure 1B:
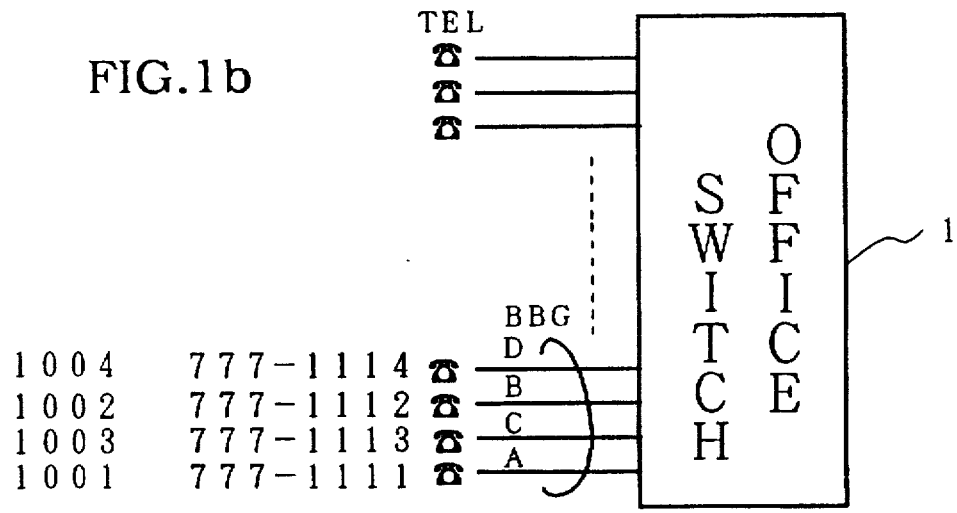

FIG. 1 is an explanatory diagram of the applied example of the present invention. In the diagram, numeral "1" is an office switch. The plural number of terminals, for example, telephone sets (TEL), are connected to this office switch 1.

Some of connected plural telephone sets are provided with a virtual private network and constitute the BBG (Basic Business Group), and they become registered subscribers of the BBG. In the example of FIG. 1, subscribers A, B, C and D join in the BBG. And the extension numbers are allocated and defined other than the outline number for these subscribers A through D.

Let us now consider the case where the subscribers A and D are replaced their positions locating the telephone sets respectively, as shown in (a) and (b) of FIG. 1. In this case, it becomes necessary to replace the subscriber information data in the switch 1 in corresponding to the replacement of the subscribers A and D.

This replacement of data is performed as the above-explained in the conventional method by making data necessary for a switch operator and replacing the subscriber information data table in the switch 1 by said operator of the switch as the latter-described.

To be concrete, it is required to make the data that describes the new and old number plans and present the data for the switch operator, as the above-described, in the conventional method. Further, the replacement of the data is performed by inputting commands to the switch 1 by the switch operator, based on this presented data.

In contrast, the present invention makes it possible to replace the subscriber information data in the switch by the subscriber's own without intervention of the switch operator.

Figures 3A, 3B, 3C, 3D:
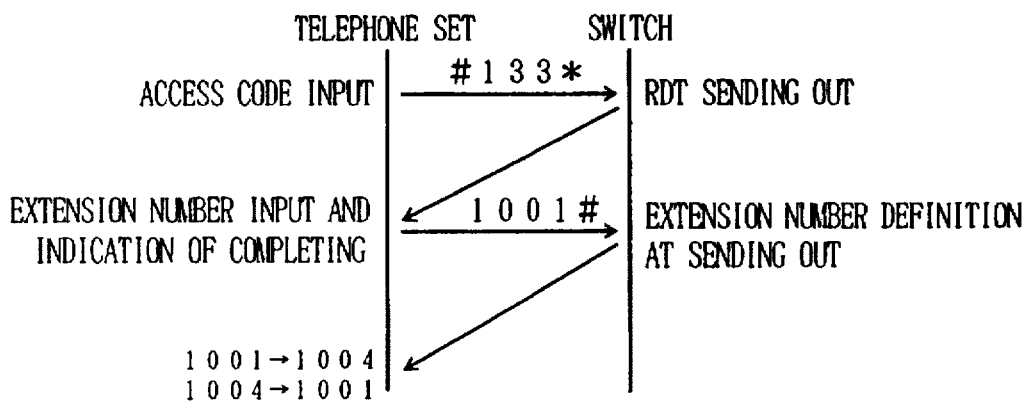
FIG. 3A–3D is an explanatory diagram showing the operation outline of the present invention (No. 2).

FIGS. 2 and 3 are diagrams for explaining the outline of operation according to the present invention.

Supposing that the subscribers A, B, C and D are arranged at their positions on the line as shown in (a) of FIG. 2. Accordingly, the telephone terminal having the extension number of 1001 is placed on the position for the subscriber A, the telephone set having the extension number of 1002 is placed on the position for the subscriber B, and the telephone terminal having the extension number of 1003 are located on the position for the subscriber C. Further, the telephone terminal having the extension number of 1004 is located for the subscriber D.

Let us consider the case where each of subscribers changes their positions as shown in (b) of FIG. 2. With this relation, the services that each of subscribers joins in are different, so that it is required to save these services. To save these services, the former subscriber number should be used on the position to which the subscriber moved and the definitions of the extension number should be changed.

As for the embodiment of the present invention as shown in FIG. 2, the subscriber A inputs 1001# following the access code of #123*, as shown in (c) of FIG. 2, on the former position of the subscriber B at first in an operation procedure.

It becomes possible for the subscriber A moved to other position to set for changing the telephone terminal located on the former position of the subscriber B to the extension number 1001 by inputting the number as the above-described.

This procedure is further shown as the control procedure used between the telephone terminal and the switch in (d) of FIG. 2.

That is, in this embodiment, #123* is inputted as an access code from the telephone set. A redial tone (RDT) is sent out when the access code is received on the side of switch. The extension number and the indication of completing are inputted, namely, # is inputted after inputting of the fixed defined extension number is made, when the redial tone (RDT) is received on the telephone set.

Accordingly, an acceptance tone (AT) indicating the completion of defining the extension number on the side of the switch is sent to the side of telephone set. As a result, the definition is switched to the inputted extension number.

FIG. 3 is an example of other operation for registering to change the extension number according to the present invention. This is a method for changing to replace the former extension number on the moved position with the own extension number with the operation of subscriber once, in the case to move the position (a) to (b) of FIG. 3.

(a) and (b) of FIG. 3 show the situation in the case where the subscribers A, B, C and D are located with the order of C, D, B and A by changing their positions as same as FIG. 2.

Therefore, the subscriber A has the extension number 1001 and defines the extension number 1004 to 1001 by inputting #333*1001# on the position where the former subscriber D stayed. Accordingly, the former extension number 1001 is defined to change to 1004 at the same time. The subscriber B has the extension number 1002, and changes the extension number 1003 to 1002 at the same time by inputting #333*1002# on the position C in concurrence with changing the extension number 1002 to 1003.

Further, the subscriber C has the extension number 1003 and inputs #333*1003# on the position A. As a result, the extension number 1004 is changed to 1003 and the extension number 1003 is changed to 1004.

(d) of FIG. 3 shows the signal procedure between the telephone set and the switch as same as (d) of FIG. 2. That is, the switch sends out the redial tone (RDT), as the access code #133* is inputted from the telephone set. Then, the indication # shown to input and finish the extension number 1001 is inputted from the telephone set and sent to the switch. As a result, the switch defines the extension number and sends out the acceptance tone (AT) to the side of the telephone set.

As a result, for example, the number of subscriber 1001 is changed to 1004 and 1004 is changed to 1001 as above-described. Further, in the example shown in FIG. 3, the subscriber D is not required for any operation to change the extension number of the telephone set at the newly moved position of the subscriber D to the extension number 1004, because it has been changed by the operations of other subscribers.

As compared with the method in FIG. 2, the method in FIG. 3 has a characteristic in that the extension numbers of all subscribers can be changed with operation for (the number of subscribers–1) times.

Figure 4:
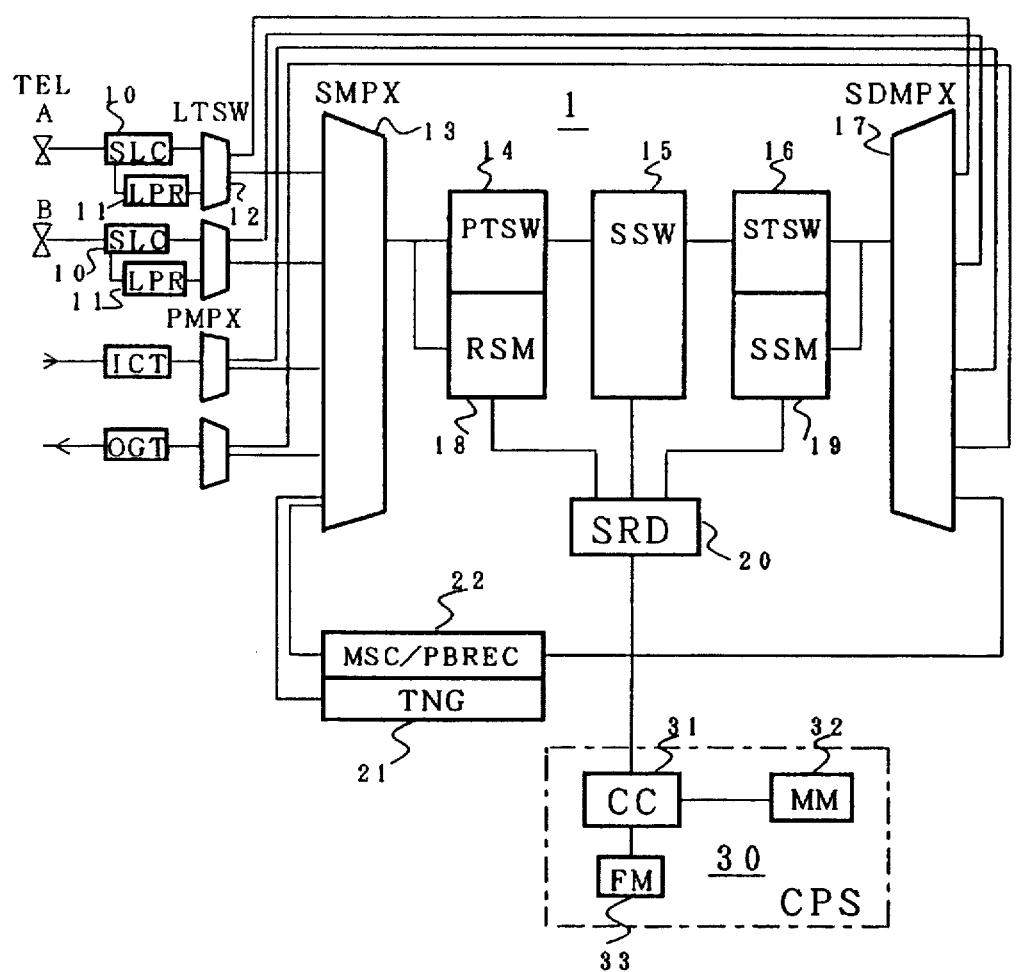
FIG. 4 is a block diagram showing one example of an office switch system.

Next, the structure of a specific embodiment for improving the operation of the present invention explained in FIGS. 1 through 3 is described. FIG. 4 is a block diagram of one example of the office switch system applying the present invention. This switch system is constituted of a subscriber line circuit section, a digital switch module section and a central processing section.

The subscriber line circuit section is constituted of a subscriber line circuit (SLC) 10, a subscriber line processor (LPR) 11, and a concentration time switch (LTSW) 12 and the like.

The digital switch module section has a secondary multiplexor (SMPX) 13, a primary time switch section 14, a space switch section (SSW) 15, secondary time switch section (STSW) 16, a secondary demultiplexor (SDMPX) 17, a receipt signal memory (RSM) 18, a sending signal memory (SSM) 19 and a signal receipt distribution device (SRD) 20.

Further, the central processing section (CPS) 30 has a central processor (CC) 31, a main memory (MM) 32 and a file memory (FM) 33.

Furthermore, the above-described signal receipt distribution device (SRD) 20 has a function of an interface with PTSW 14, SSW 15, STSW 16, RSM 18, SSM 19 and CPS 30.

The system is provided with the circuit for generating the service tone and so on, which means, it has a tone generator (TNG) 21, a multiple frequency signal circuit and a PB receiver (MFC/PBREC) 22.

The operation in the case where the present invention is applied to this office switch system is described as follows.

Figure 5A:
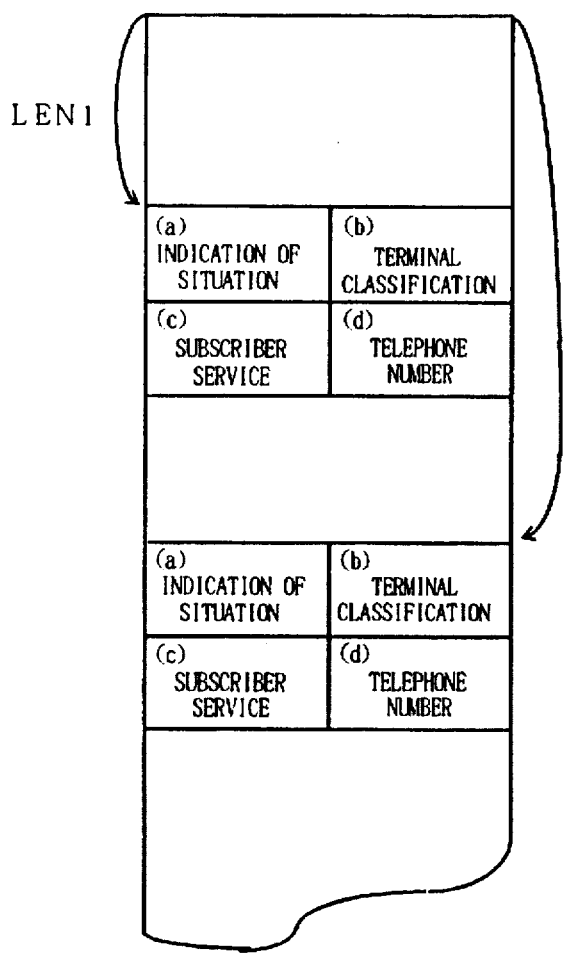
FIG. 5A–5B is a diagram showing one example of a subscriber information table.
Figure 5B:
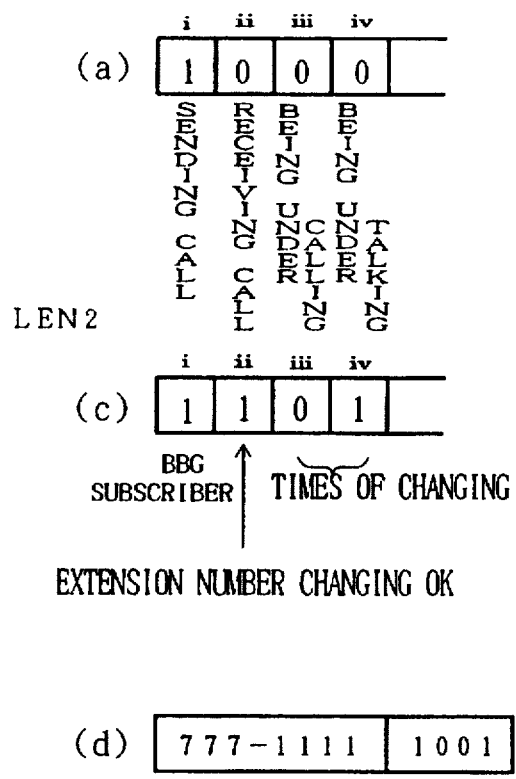

FIG. 5 shows one example of the subscriber information table provided on the file memory (FM) 33 of the central processing section (CPS) 30.

The subscriber information table is to store the subscriber data showing the indication of situation about each subscriber ((a) of FIG. 5), the content of receiving services ((c) of FIG. 5) and so on.

These data are stored in the address space area specified by a subscriber receipt position information LEN, which will be described based on FIGS. 6 and 8 latter, per each of subscribers on the subscriber information table. In (a) of FIG. 5, a data area for the indication of situation is provided, which is an area for representing sending call, receiving call, being under calling, being under talking over the telephone to each location of bits i, ii, iii, and iv respectively.

The terminal classification of (b) of FIG. 5 is an area for storing information, such as whether the telephone set owned by the subscriber has a dial system or push button system.

(c) of FIG. 5 has a data area for presenting the subscriber service information such as whether the subscriber is of the BBG or not, whether it is possible to change the extension number or not, the times of changing the extension numbers and the like to each location of bits i, ii, iii and iv respectively. And (d) of FIG. 5 is an area for storing the data regarding the telephone number, and the outline number and the extension number, that are, the outline number 777-1111 and the extension number 1001 in the diagram respectively.

Figures 6A, 6B, 6C:
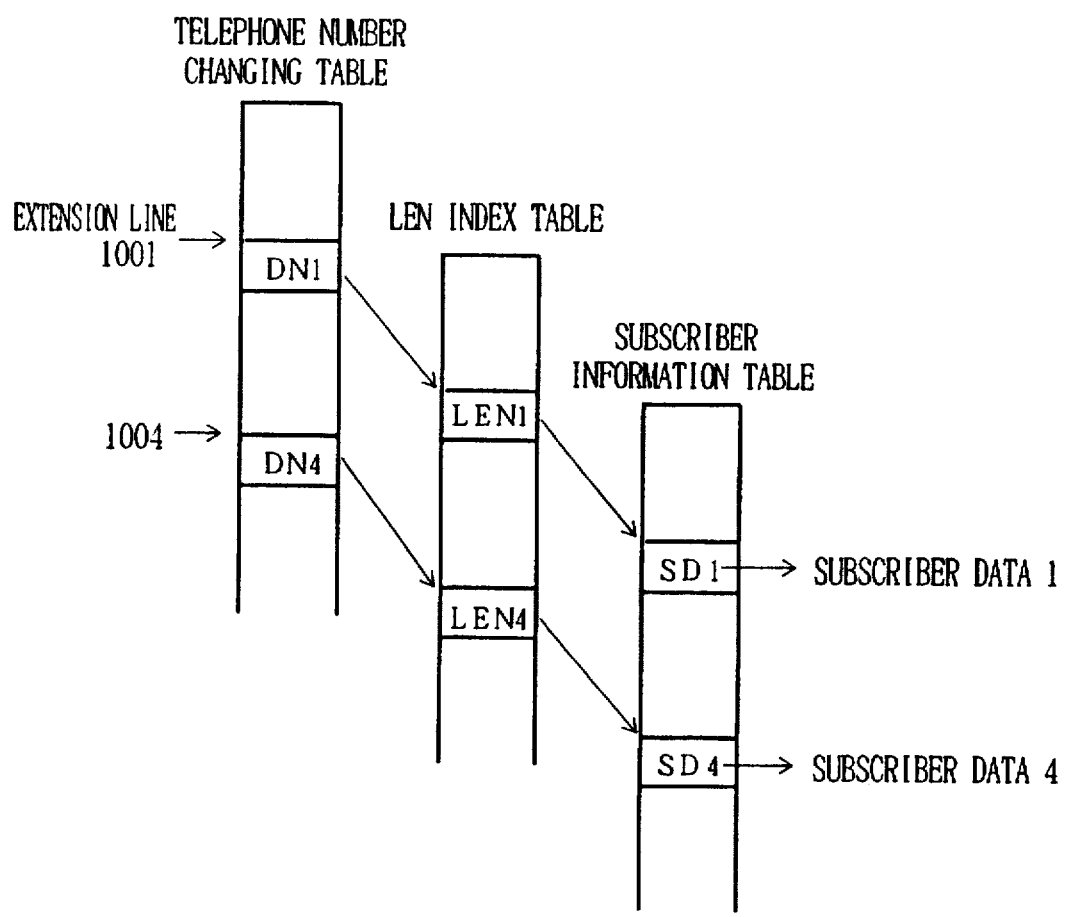
FIG. 6A–6C is a diagram showing the interrelationship of the subscriber data table.

FIG. 6 shows the interrelationship of subscriber data tables to find the subscriber data from the subscriber information table finally. That is, a file memory (FM) 33 has a telephone number changing table (a), LEN index table (b) and the subscriber information table (c) as a storage area.

The telephone number changing table (a) is used for indexing the outline number DN by using the extension number as an address.

In FIG. 6, the example is shown that the outline number DN1 is indexed by using the extension number 1001 as an address, and the outline number DN4 is indexed by using the extension number 1004 as an address on the telephone number changing table (a).

And a LEN which corresponds to a line equipment number and is stored as a subscriber line position information is indexed by using an outline number DN as an address on the LEN index table. That is, LEN1 is indexed by the outline number DN1 and LEN4 is indexed by the outline number DN4, as shown in (b) of FIG. 6.

Further, the subscriber data is obtained from the subscriber information table (c) by using the indexed subscriber line position information LEN as an address. In FIG. 6, the subscriber data SD1 is obtained by using the subscriber line position information LEN1 as an address and the subscriber data SD4 is obtained by using the subscriber line position information LEN4 as an address.

Accordingly, it becomes required to change these series of the telephone number changing table (a), the LEN index table (b) and the subscriber information table (c) in the case where the extension number is changed.

Figure 7A:
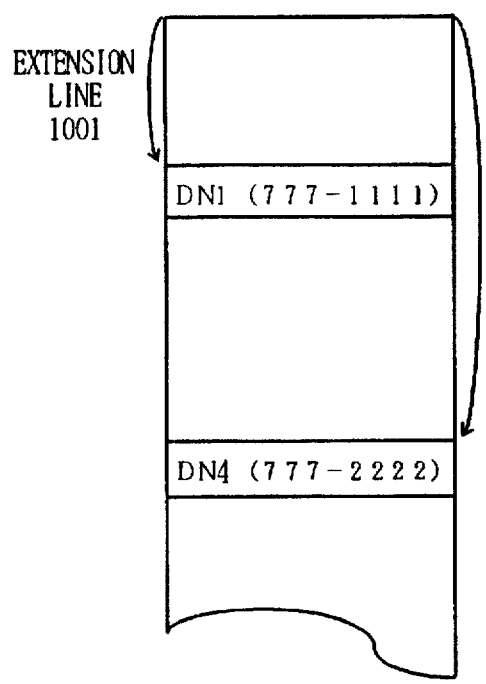
FIG. 7A–7B is a changing example for the telephone number changing table.
Figure 7B:
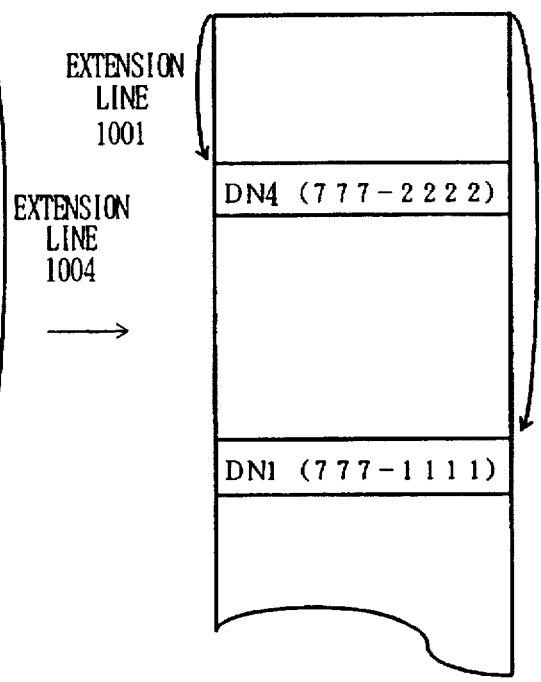
Figure 8A:
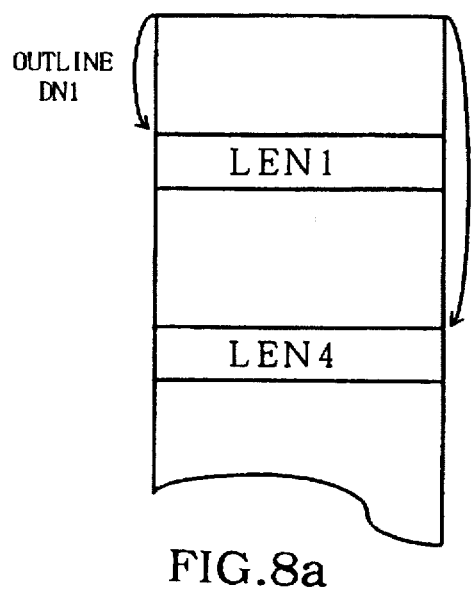
FIG. 8A–8B is a changing example for the LEN index table.
Figure 8B:
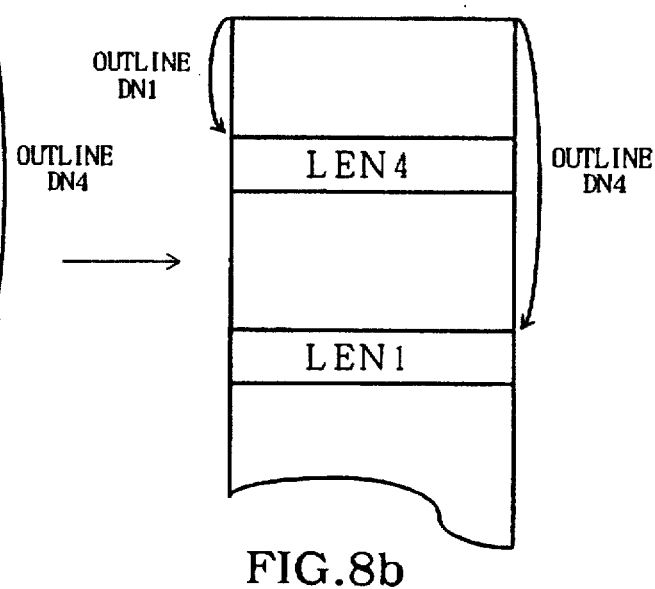
Figures 9A, 9B:
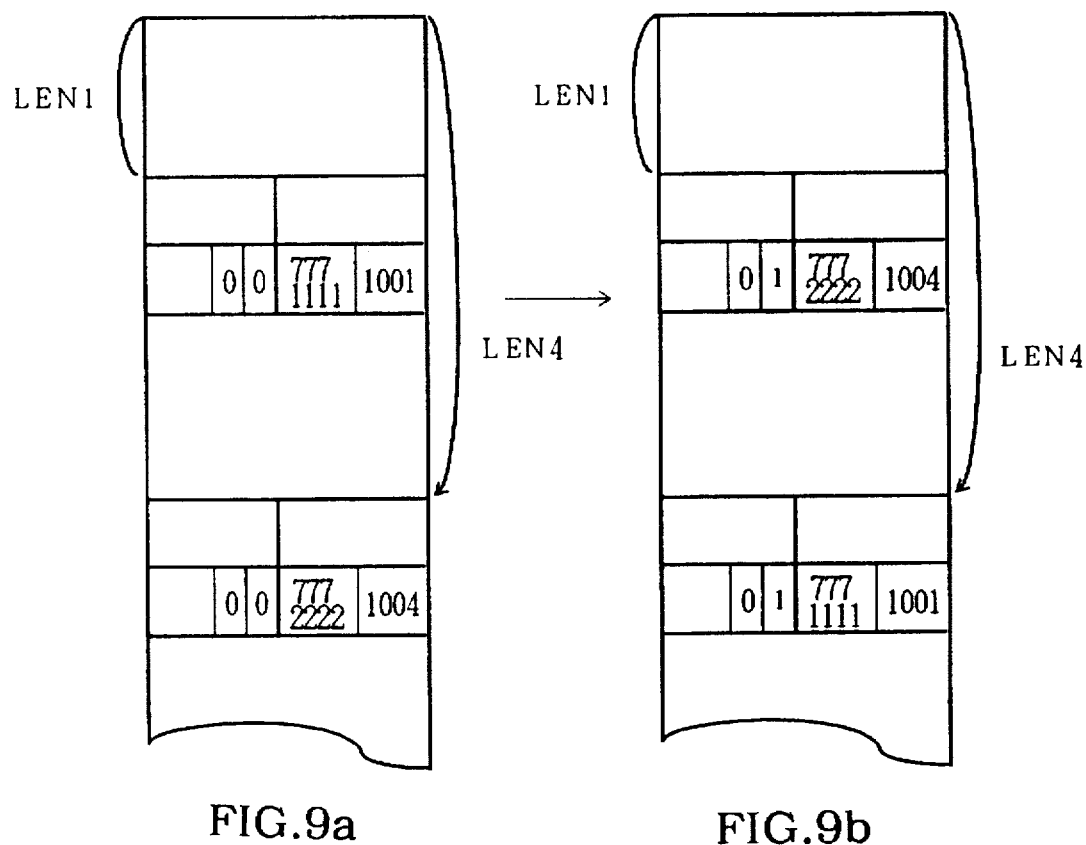
FIG. 9A–9B is a changing example for the subscriber information table.

These situations are shown in FIGS. 7 through 9. FIG. 7 shows the changed example of the telephone number changing table ((a) of FIG. 6), that is, the example for changing the outline number DN1 indexed with the extension number 1001 and the outline number DN4 indexed with the extension number 1004 respectively such as shown in (a) and (b) of FIG. 7.

After changed, the outline number indexed with the extension number 1001 as shown in (b) of FIG. 7 becomes DN4 and the outline number indexed by the extension number 1004 becomes DN1. In contrast, the LEN index table is also changed as shown in FIG. 8.

The subscriber line position information LEN1 indexed by the outline number DN1 as shown in (a) of FIG. 8 is switched to the subscriber line position information LEN4 indexed as shown in (b) of FIG. 8.

LEN4 indexed by the outline DN4 is changed so as to index LEN1 as shown in (b) of FIG. 8.

Next, as shown in FIG. 9, the subscriber data indexed by the subscriber line position information LEN1 shows the subscriber having the extension number 1001, and the subscriber data indexed by the subscriber line position information LEN4 shows the subscriber having the extension number 1004 on the subscriber information table.

After being changed, the data indexed by the subscriber line position information LEN1 is the subscriber data having the extension number 1004 and the data indexed by LEN4 is the subscriber data having the extension number 1001, as shown in (b) of FIG. 9.

The switch 1 can control for connecting the extension lines and the outlines based on the subscriber data of this subscriber information table.

According to the operation flows in FIGS. 10 through 20, the method for changing and defining the extension number of the present invention in the case where the office switch system is used as shown in FIG. 4 is explained as follows. Further, as it becomes important to understand for changing and defining the extension number of the present invention, the operation for connecting the extension line is described at first.

FIGS. 10 through 14 are flows for explaining the operation of connecting the extension line between the subscribers (suppose the subscriber A and the subscriber B) having two extension numbers which are connected to the office switch.

The block diagram of the office switch system in FIG. 4 will be referred in explaining the following operation flows.

When the subscriber A takes up a handset, the subscriber line processor (LPR) 11 detects that the subscriber line circuit is closed. Next, an idle time slot is selected by the concentration time switch (LTSW) 12 and the signal indicated to send call is inputted to the central processor (CC) 31 of the central process section (CPS) 30.

Further, the signal indicated to send call is inputted via a secondary multiplexer (SMPX) 13, a receipt signal memory (RSM) 18 and a signal receipt distribution device (SRD) 20 for fulfilling the interface function in FIG. 4.

Return to FIG. 10, when the central processor (CC) 31 detects the sending call of the subscriber A (STEP S1), the subscriber line position information LEN1 of the subscriber A is received (STEP S2).

Then, the central processor (CC) 31 accesses the file memory (FM) 33 and stores the subscriber data of LEN1 into the main memory (MM) 32 (STEP S3).

The subscriber data of LEN1 is obtained by reading out the subscriber data 1, that is, SD1, corresponding to the subscriber A from the subscriber information table used the subscriber line position information LEN as the address number, as understood from the interrelation diagram of the subscriber data table described in FIG. 6.

The regularity is analyzed for the subscriber data of LEN1 stored in the main memory (MM) 32 (STEP S4).

That is, the analysis of the subscriber information may make it be judged whether the subscriber A is one who is registered regularly or not from the data of the subscriber data 1 obtained by LEN1, as understood from one example of the subscriber information table as shown in FIG. 5.

As a result, when the subscriber A is judged not to be registered regularly, subsequent sending call is rejected (STEP S6) and the disconnection process is performed (STEP S7).

On the other hand, as a result of analysis of the subscriber data (STEP S4), when the subscriber A is judged to be registered regularly, the subscriber data of LEN1 is accessed in the main memory (MM) 32 and a flag is set, which makes the sending information corresponding to i bit of (a) in FIG. 5 of the current situation of subscriber, to "1". This content of the flag is sent to the file memory (FM) 33 and the content is updated (STEP S8).

Then, the central processor (CC) 31 sends a dial tone by connecting the tone generator (TNG) 21 to the telephone of the caller, that is, the subscriber A (STEP S9).

Further, the PB receiver 22 is connected to the telephone set of the subscriber A who sends call (STEP S10). By making this situation, the central processor (CC) 31 receives the dial information from the subscriber A (STEP S11).

When the dial information is received, the tone generator 21 is disconnected from the telephone set of the subscriber A who sends call (STEP S12). Then, the central processor (CC) 31 converts the received dial information to figure of number and stores them in the main memory 32 (STEP S13).

And this receipt dial number received and converted to the figure of number is analyzed (STEP S14). On this analysis, it is judged whether the figure is the extention number or not (STEP S15). In the case where it is an access code which is not the extension code, the flow of operation is connected to the extension registration changing operation flow according to the present invention as the latter-described.

When it is judged that the receipt figure is the extension number, the subscriber A is checked by the subscriber data of LEN1 (STEP S16) whether it is a subscriber of the BBG or not (STEP S17).

When the subscriber A is judged not any subscriber of the BBG, sending signal is rejected (STEP S18) and the disconnection process is performed (STEP S19), as it is impossible to connect any extension line. On the other hand, when the subscriber A is judged the subscriber of the BBG, the central processor 31 accesses the telephone number changing table of the file memory 31 by using the received extension number 1004 as an address, because it is possible to connect the extension line (STEP S20).

The telephone number of the subscriber D who is called, that is, the outline number DN4 is read out from the telephone number changing table of the accessed file memory 33. Then, the LEN index table is accessed by using this outline number DN4 as an address and LEN4 is read out. The read-out outline telephone number of the called subscriber and LEN4 are stored in the main memory 32 (STEP S21).

Then, the file memory 33 is accessed again, the subscriber information table is searched by LEN4 as an address and the subscriber data SD4 positioned at the address corresponding to LEN4 is stored in the main memory 33 (STEP S22).

And the subscriber data of LEN4 is checked (STEP S23). By this checking, it is judged whether the subscriber D of LEN4 is idle or not, depending on the content of the flag indicating 0 or 1 in the bit iv of (a) of FIG. 5 (STEP S24).

In the case where the flag is indicating 1, namely, the subscriber D is busy, the subscriber A sending a call is connected to the tone generator 21 and the busy tone is sent to the subscriber A (STEP S25). And then, the disconnection process is performed (STEP S26).

When the subscriber D is judged to be idle, the subscriber data is read out from the main memory 31 and the content of file memory is updated (STEP S27).

The call of LEN4 for the subscriber line processor (LPR) 11 corresponding to LEN4 is instructed (STEP S28). After that, LEN1 is connected to the tone generator 21 and a ring back tone is sent to the subscriber A of LEN1 (STEP S29).

Accordingly, the speech pass between LEN1 and LEN4 is reserved (STEP S30).

The response from the subscriber D is confirmed for the call to LEN4 (STEP S31). When there is the response of LEN4, LEN1 and LEN4 are connected through the speech pass reserved (STEP S32).

Further, in the subscriber data for LEN1 and LEN4, iv bit of (a) of FIG. 5 is set as "1" to indicate that the line is busy and the content of the file memory 33 is updated corresponding to this data (STEP S33).

When the speech is over and the disconnection of the line is detected (STEP S34), it is judged whether it is LEN1 or not (STEP S35).

In the case where LEN1 is disconnected, the speech pass is released (STEP S36) and LEN1 is connected with the tone generator 21 (STEP S37). Then, the busy indication shown in the subscriber data of LEN1 at the bit iv in (a) of FIG. 5 is set idle and the content of the file memory 33 is updated corresponding to the indication (STEP S38).

On the other hand, when it is judged that the disconnection is not on LEN1 (STEP S35), LEN4 is connected with the tone generator 21 (STEP S39). And the indication shown in the subscriber data of LEN4 at the bit iv in (a) of FIG. 5 is set idle and the content of the file memory 33 is updated corresponding to the indication (STEP S391).

Further, the disconnect detection is judged (STEP S40), and it is judged whether it is LEN4 or not (STEP S41). In the case where it is LEN4, the subscriber data of LEN4 is set idle as the above-described and the content of the file memory 33 is updated corresponding to the indication (STEP S42).

When it is judged that it is not LEN4 (STEP S41), the speech pass is released (STEP S43), the subscriber data of LEN1 is set idle and the content of the file memory 33 is updated corresponding to the indication (STEP S44).

Accordingly, the speech connected by the extension line between the subscribers of LEN1 and LEN4 is finished (STEP S45).

Figure 15:
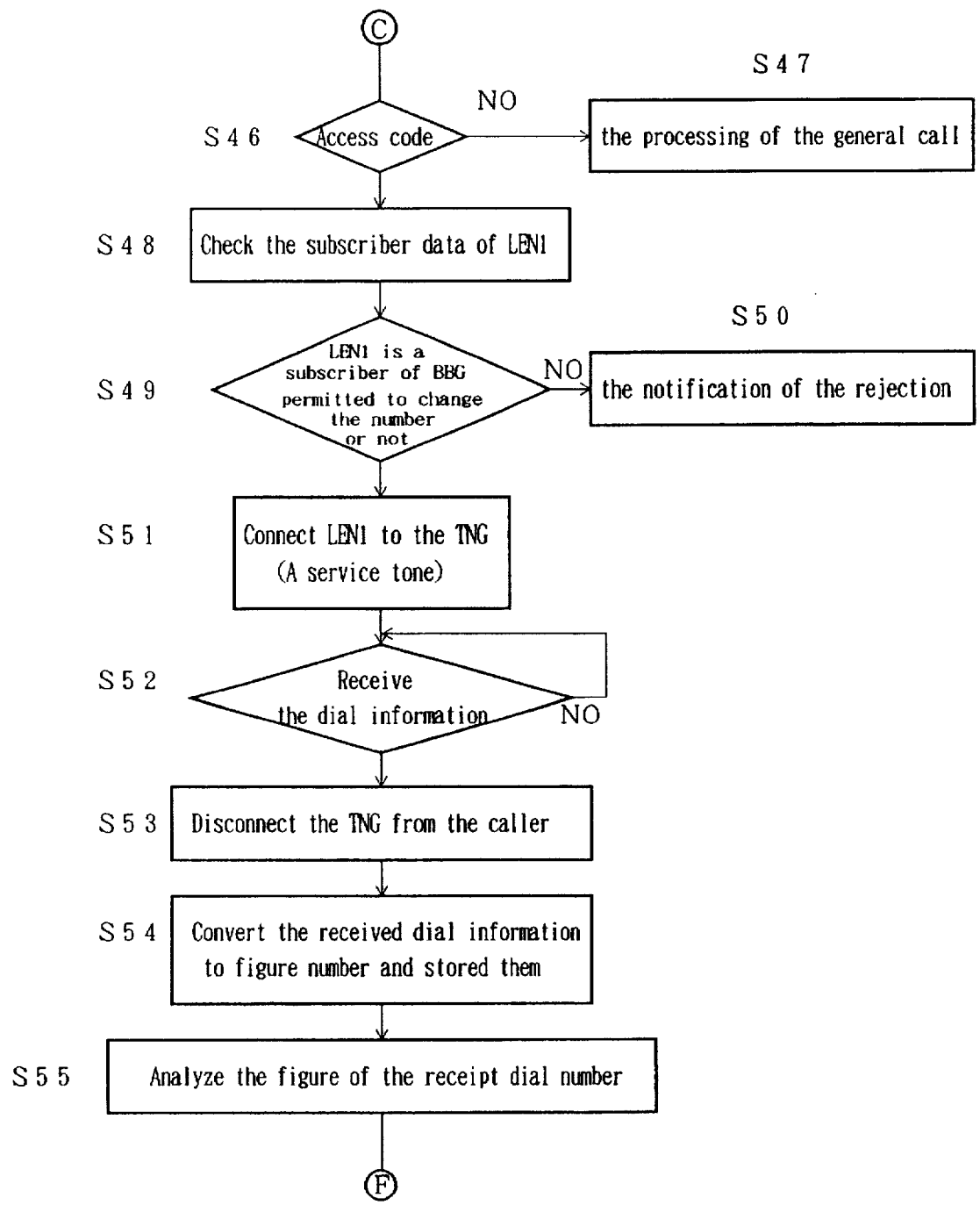
FIG. 15 is an operation flow of the present invention.
Figure 16:
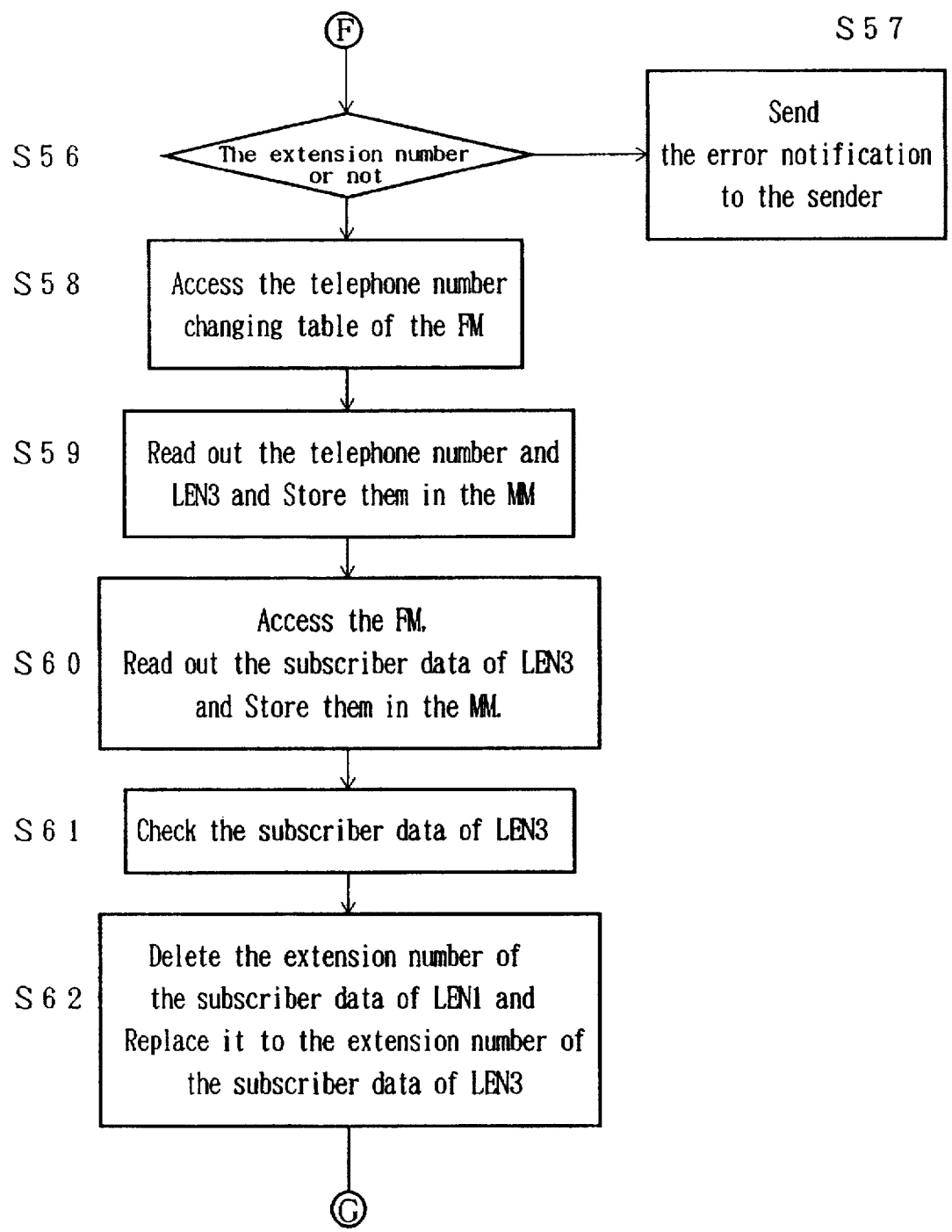
FIG. 16 is an operation flow of the present invention (No. 1).
Figure 17:
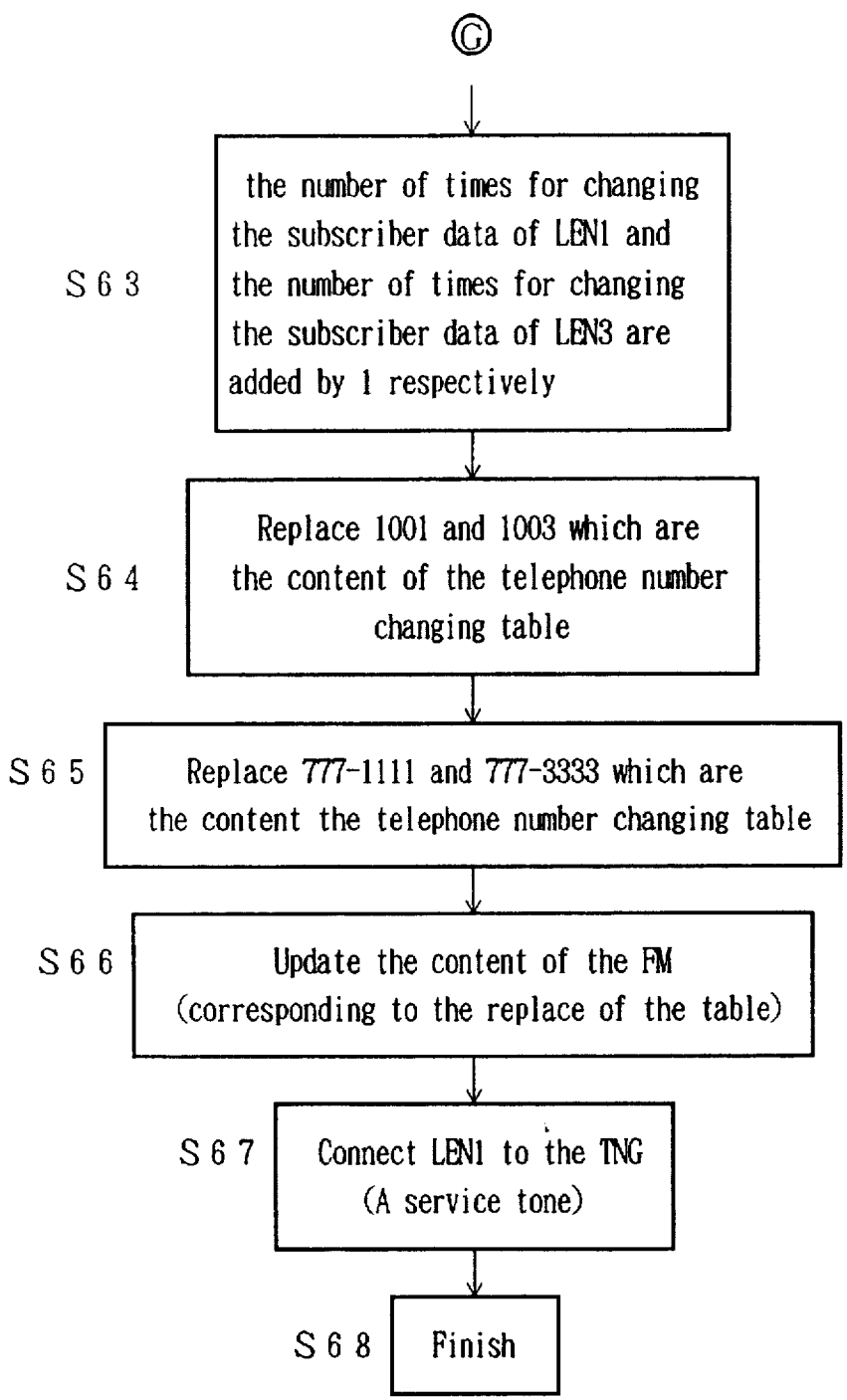
FIG. 17 is an operation flow of the present invention (No. 2).

Next, one method for changing the extension number of the present invention explained in FIG. 2 is described according to the operation flows in FIGS. 15 through 17.

FIG. 2 shows the subscriber deletes the extension number of the former subscriber on the position where the subscriber moved and replaces the detected extension number to its own subscriber number. The operation is now described, which is the case where the subscriber C replaces the extension number of the telephone set of the position of the former subscriber A to the extension number 1003 owned by the subscriber C, when the position is moved from (a) to (b) in FIG. 2.

Further, the operation performed by other subscribers A, B and D is also described as follows.

When the received dial number is judged not any extension number on STEP S15 (FIG. 11), the operation on the step is continued to the operation flow of a method of the present invention in FIG. 15.

And it is judged whether the code inputted by the subscriber C is an access code or not (STEP S46). When the code is judged not any access code, it is judged a general call, and the processing for the general call is performed (STEP S47).

When it is an access code and further, it is in the example of FIG. 2, checking of the subscriber data of LEN1 is performed in the case where it is judged #123* (STEP S48) and it is also judged whether LEN1 is a subscriber of the BBG permitted to change the number or not (STEP S49). This is judged depending whether the bit ii of the subscriber service in (c) of FIG. 5 is "1" or not.

In the case where it is not the subscriber of the BBG, the notification of the rejection is sent to the caller or sender, that is, the subscriber C in this case (STEP S50). In the case where it is judged the subscriber of the BBG, LEN1 is connected to the tone generator 21 and the service tone is sent to the sender (STEP S51).

And, the dial information from the sender, that is, the information corresponding to the extension number 1003 dialed by the subscriber C, is received (STEP S52).

When the dial information is received, the tone generator 21 is disconnected from the sender (STEP S53). And then, the received receipt dial information is converted to figure of number and stored (STEP S54), and the figure of the stored receipt dial number 1003 is analyzed (STEP S55).

In analyzing the figure of the receipt dial number, it is judged whether the receipt dial number is the extension number or not (STEP S56) and the error notification is sent to the sender in the case where it is not any extension number (STEP S57).

In the case where it is the extension number, the telephone number changing table of file memory 33 is accessed by using the extension number as an address (STEP S58).

In the file memory 33, the outline number DN is read out from the telephone number changing table accessed by the extension number and the corresponding LEN is read-out from the LEN index table by the read-out outline number as shown in FIG. 6. And the LEN is stored in the main memory 32 (STEP S59).

Further, the file memory 33 is accessed, and the corresponding subscriber data is read-out by using LEN3 as an address from the subscriber information table of LEN3 and is stored in the main memory 32 (STEP S60). And the subscriber information of LEN3 read out is checked (STEP S61).

The extension number 1001 of the subscriber data of is deleted from the main memory 32 by the control of the central processor 31 and is replaced to the extension number 1003 of the subscriber data of LEN3 (STEP S62).

Further, the number of times for changing the subscriber data of LEN1 (refer to (c) in FIG. 5) and the number of times for changing the subscriber data of LEN3 are added by 1 respectively (STEP S63).

The outline numbers DN1 and DN2 which are the contents of the telephone number changing table are replaced (STEP S64).

At the same time, LEN1 and LEN3 are replaced depending on the outline numbers 777-1111 and 777-3333 which are replaced in the content of the LEN changing table (STEP S65). Then, the content of the file memory 33 is updated corresponding to the replace of subscriber information table, the telephone number changing table and the content of the LEN changing table on the main memory 32 as the above-described (STEP S66).

At last, LEN1 is connected to the tone generator 21 and the service tone is sent to the sender (STEP S67), thus finishing the registration for changing the extension number (STEP S68).

Then, the other example of a method for registering to change the extension number according to the present invention is described as follows, in which the the position is moved from (a) to (b) in FIG. 3 as the above-described, the operation for replacing and changing the extension number of the position where the subscriber moved to the extension number owned by the subscriber is performed by only one operation.

Figure 18:
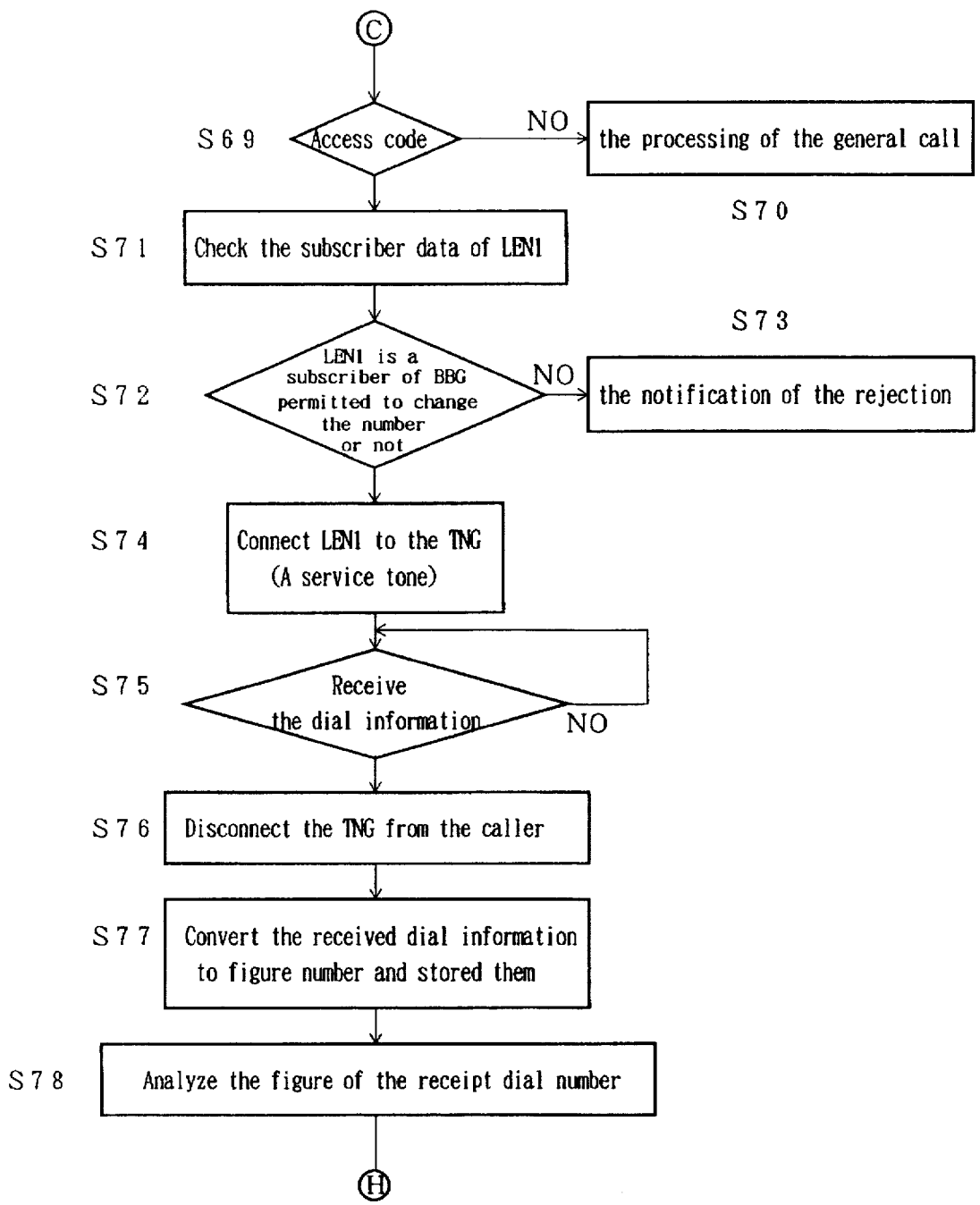
FIG. 18 is an operation flow of the present invention (No. 3).
Figure 19:
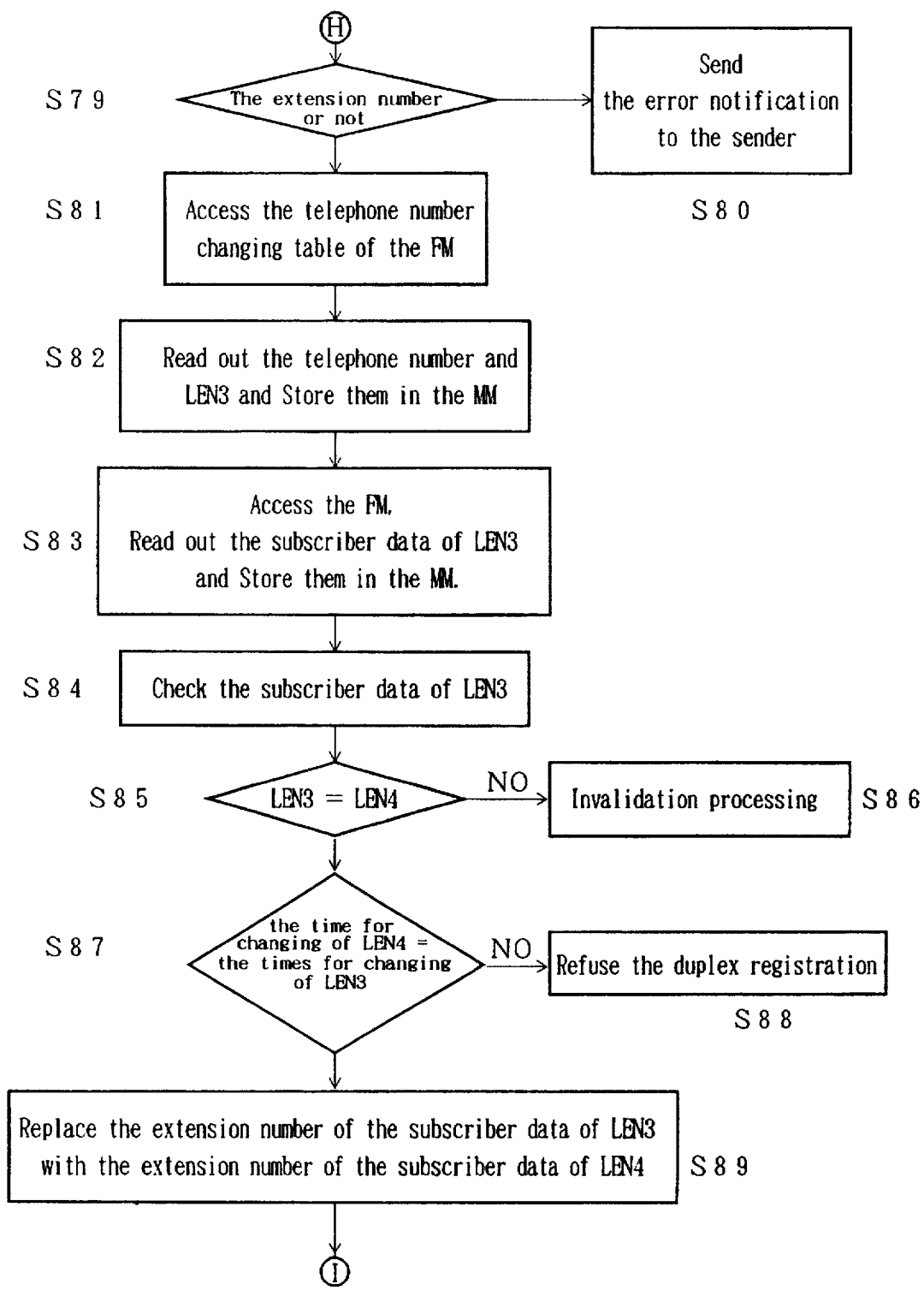
FIG. 19 is an operation flow of the present invention (No. 4).
Figure 20:
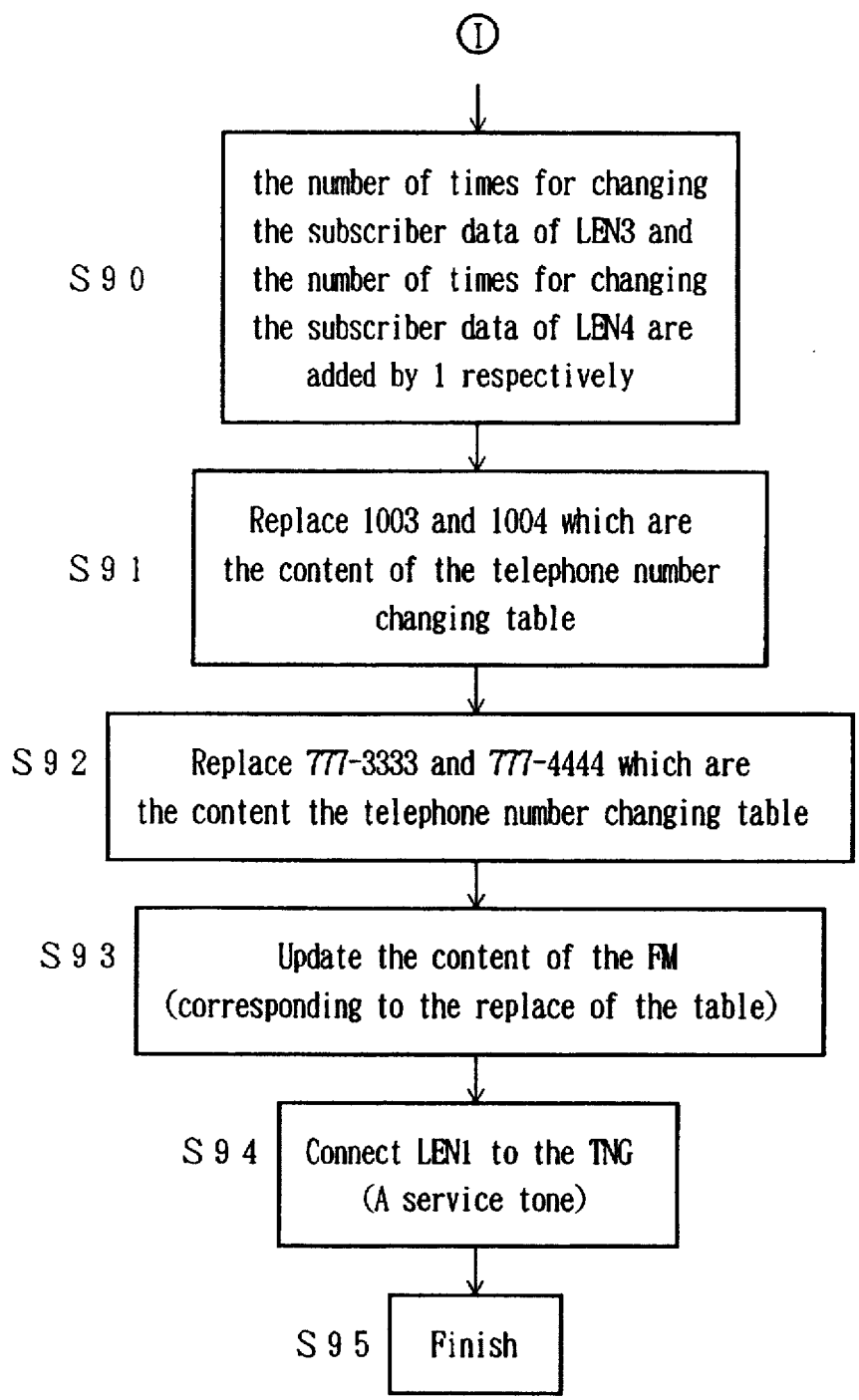
FIG. 20 is an operation flow of the present invention (No. 6).

FIGS. 18 through 20 show flows for explaining the operation performed by the subscriber C when the position is moved from (a) to (b) in FIG. 3. Further, the operations by the subscribers A and B are also same.

Although the telephone set operated by the subscriber C is one at the former position of the subscriber A, the extension number 1001 has already been replaced with 1004 by the operation for changing and registering of the subscriber A and been registered for changing to the extension number 1004 corresponding to the subscriber line position information LEN4.

Further, the telephone set on the former position of the subscriber C has already been changed to the extension number 1002 by the operation of the subscriber B for changing and registering and the telephone terminal on the former position of the subscriber B has been also changed to the extension number 1003.

Accordingly, the extension number 1003 is replaced and changed to the number 1004 by the operation on the present position of the subscriber C, that is, the former position of the subscriber A.

Figure 10:
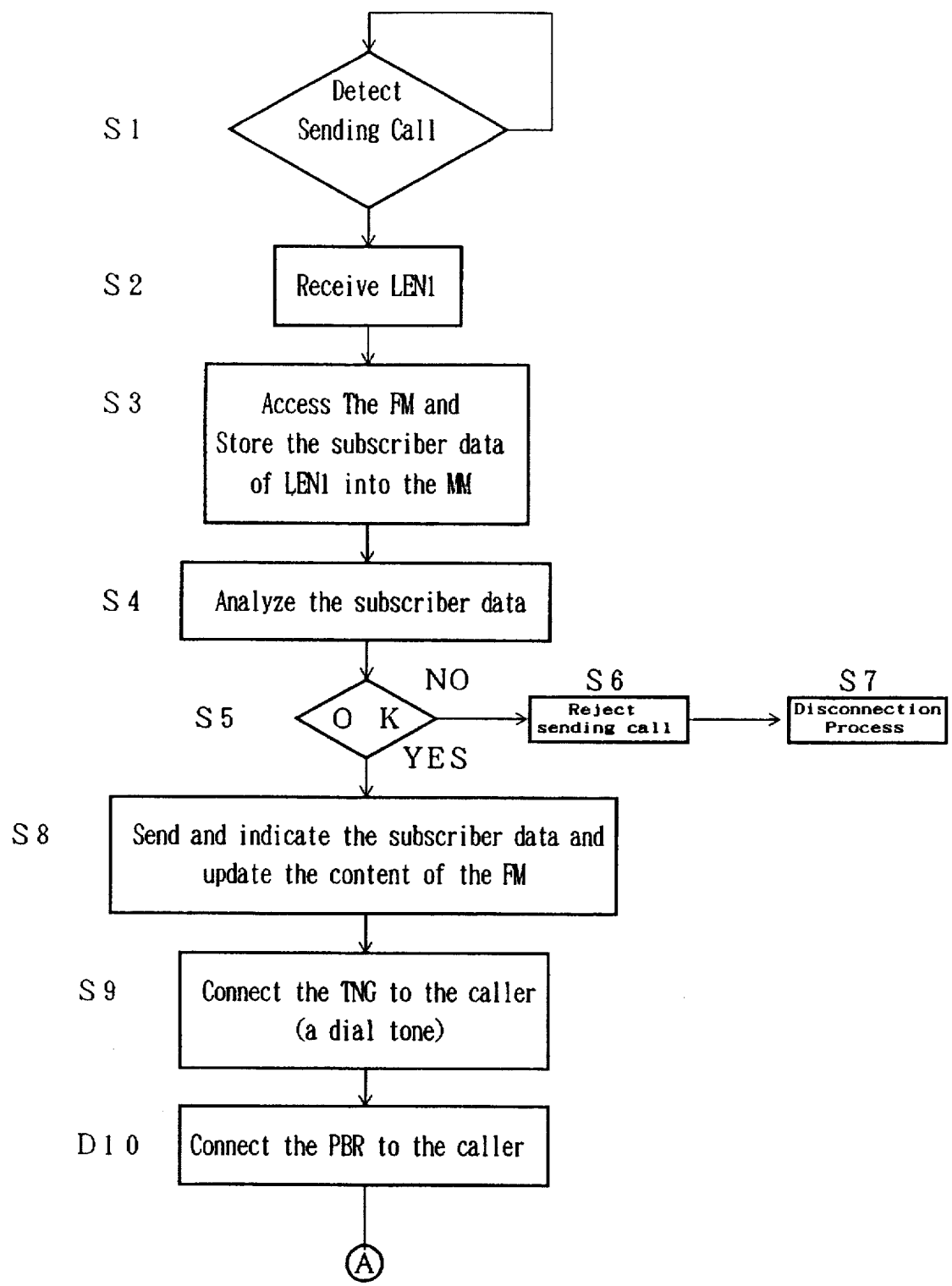
FIG. 10 is an operation flow of the connection of extension line (No. 1).
Figure 11:
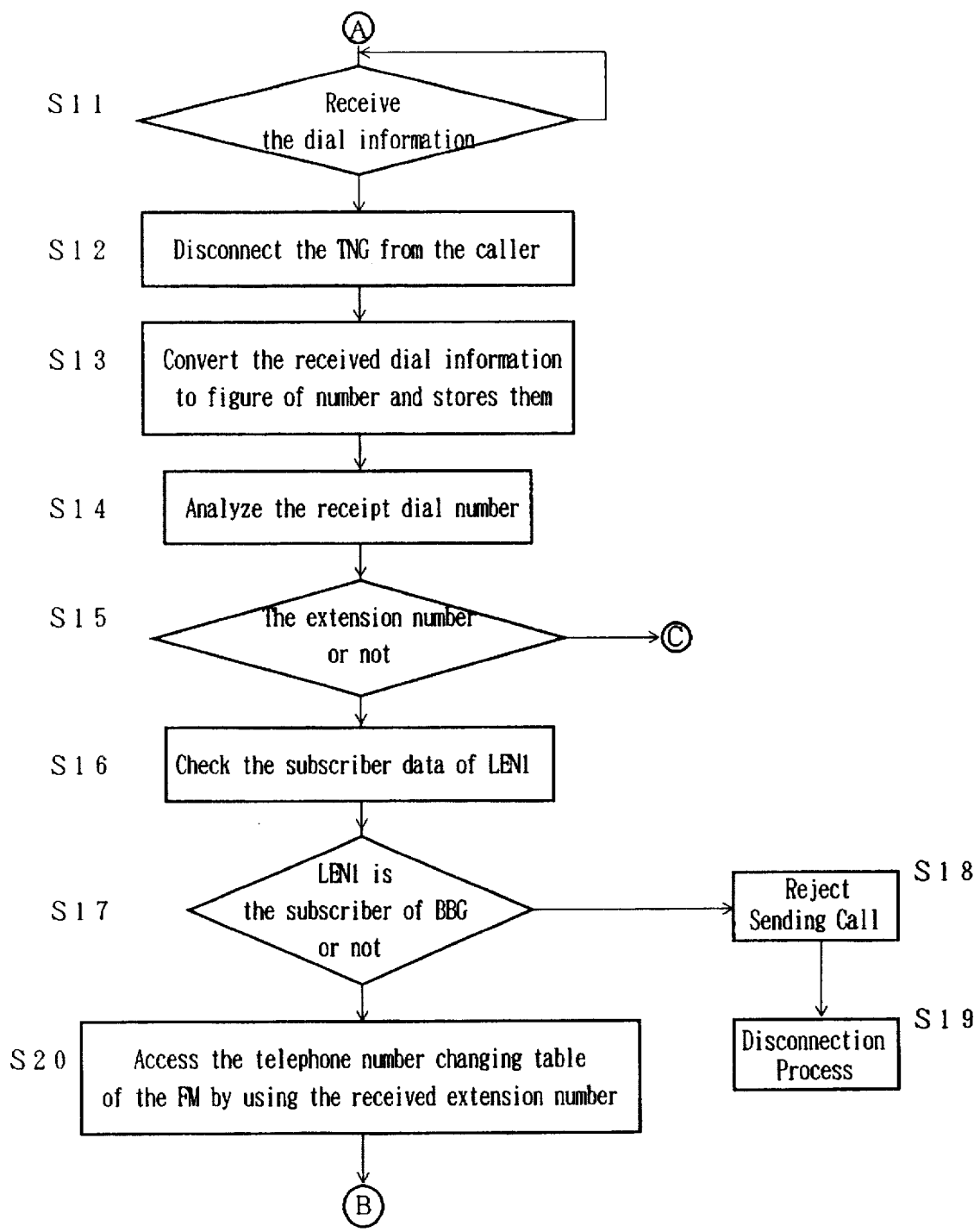
FIG. 11 is an operation flow of the connection of extension line (No. 2).
Figure 12:
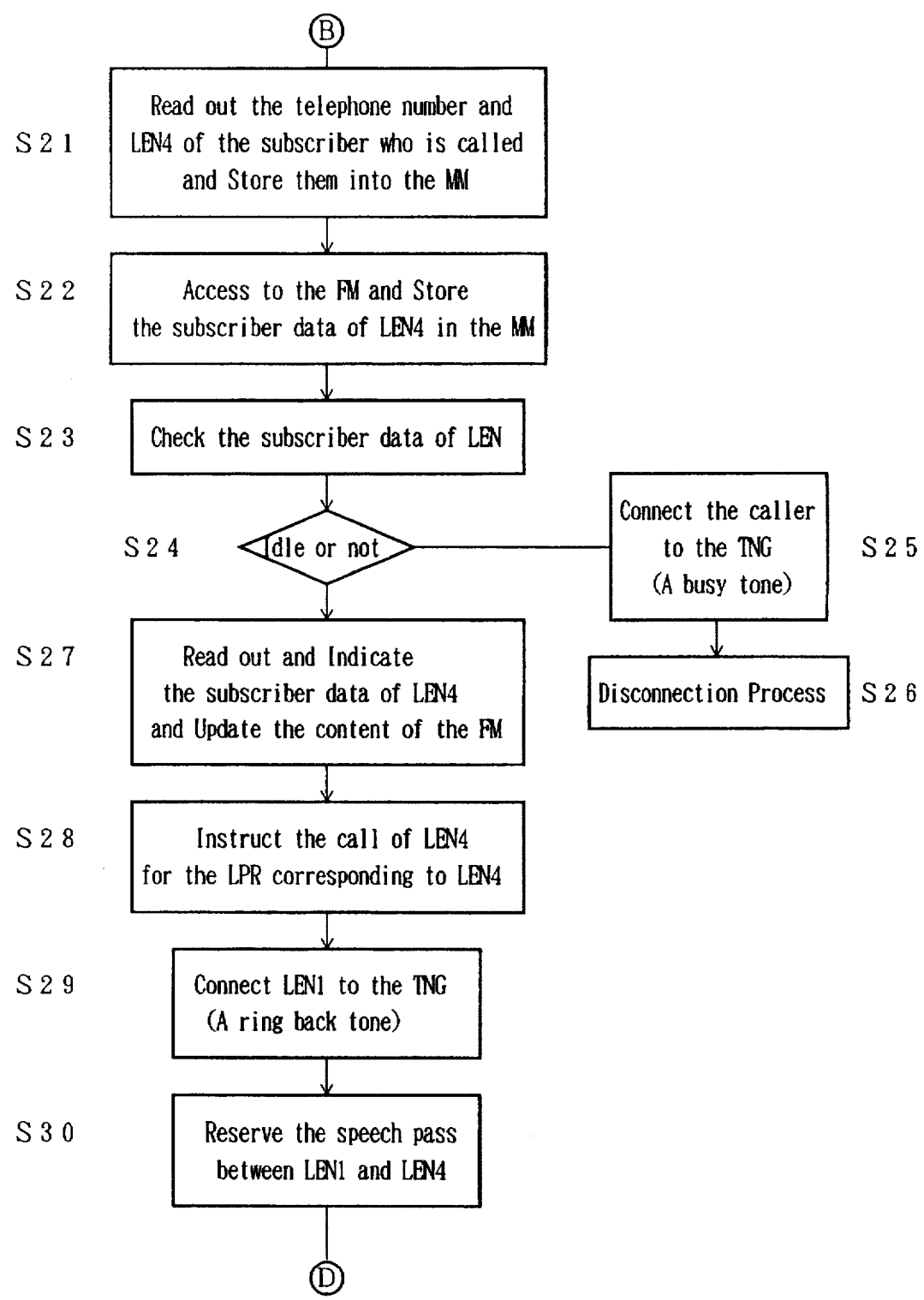
FIG. 12 is an operation flow of the connection of extension line (No. 3).
Figure 13:
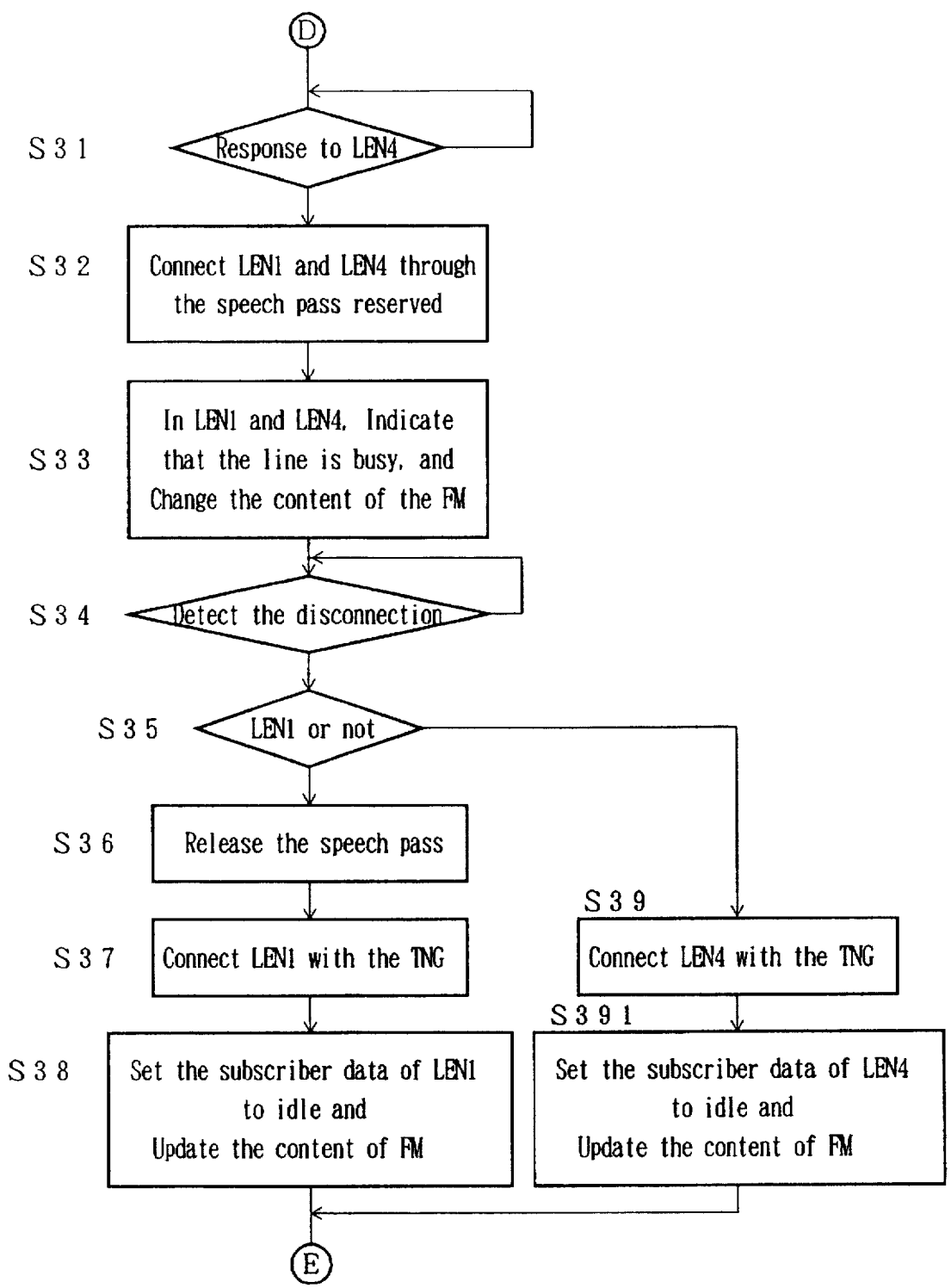
FIG. 13 is an operation flow of the connection of extension line (No. 4).

In this case, the central processor 31 receives LEN4 on the step S2 as the above-described in FIG. 10. Accordingly, the subscriber information of LEN4 is sent and indicated and the contents of the file memory 33 is updated as the above-described on the STEP S8 in FIG. 10.

Further, when it is judged not any extension number, the operation is continued to the flow of the present invention in FIG. 15 and it is judged whether it is an access code or not (STEP S69). In the case where it is not an access code, the general call processing is performed regarding the call (STEP S70).

In the example of FIG. 3, when it is an access code and in #133*, checking of the subscriber data in the subscriber line position information LEN4 is performed (STEP S71). The checking of the subscriber data in LEN4 is performed in the same way, as the processing of the STEP S16 as the above-described, and the subscriber data is read-out by using LEN4 stored in the file memory 33 as an address code and is checked.

As the result of this checking, it is judged whether LEN4 is the subscriber of the BBG permitted to change the number or not (STEP S72).

It is judged whether LEN4 is the subscriber of the BBG or not, depending whether the information of bit i of the subscriber service information in (c) of in FIG. 5 is 1 or 0 on one example of the subscriber information table shown in FIG. 5. That is, in the case where bit i of (c) in FIG. 5 is 1, it is judged the subscriber of the above-described LEN is that of the BBG.

As the result of judgement on the STEP S72, when it is not any subscriber of the BBG, it is rejected, and the notification of the rejection is sent to the subscriber by the tone signal (STEP S73).

When it is the subscriber of the BBG, the telephone set of the subscriber corresponding to LEN4, that is, the telephone set on the position where the subscriber C stays is connected with the tone generator 21 and the service tone is sent to the subscriber (STEP S74).

And the central processor 31 receives the dial information from the telephone set of the subscriber C corresponding to LEN4, that is, information for being changed to the former extension number 1003 by the subscriber C (STEP S75).

When the dial information is received, the tone generator 21 is disconnected from the sender (STEP S76).

Then, the central processor CC31 converts the received receipt dial information, which is corresponding to the extension number 1003, to figure of number and stores it in the main memory 32 (STEP S77). Further, the receipt dial number is analyzed (STEP S78). Depending on the analysis of this receipt dial number (STEP S78), it is judged whether or not the number is the extension number (STEP S79).

When it is judged not any extension number, the error is notified to the sender, that is, the subscriber C (STEP S80). When it is judged the extension number, the telephone number changing table in the file memory 33 is accessed based on this extension number, which is 1003 in this example (STEP S81).

As described in FIG. 6, the outline number DN is indexed and extracted from the extension number by the telephone number changing table, and further, the LEN index table is indexed from the outline number DN and LEN3 is extracted. Accordingly, the extracted telephone number and LEN3 are read out and stored in the main memory 32 (STEP S82).

Further, the central processor 31 accesses the file memory 33, accesses the subscriber information table based on LEN3, reads out the subscriber information of the corresponding LEN3 and stores it in the main memory 32 (STEP S83).

And the subscriber information of the LEN3 read out is checked (STEP S84) to judge whether LEN3 is as same as LEN4 or not (STEP S85).

In the case where LEN3 is as same as LEN4, an invalidation procedure is made, as there is no meaning to register it for changing (STEP S86).

In the case where LEN3 is different from LEN4, it is judged whether the number of times for changing LEN4 is same as that for changing LEN3 or not (STEP S87). When the number of times for changing is not same, the changing is refused, as there is a possibility of the duplex registration (STEP S88).

When the number of times for changing LEN4 is same as the number of times for changing LEN3, the telephone number of the subscriber information of LEN3 is replaced with the telephone number of the subscriber information of LEN4 (STEP 89).

The replacement of this telephone number of the subscriber information is an operation for replacing the telephone number of the subscriber information table.

Next, the number of times for changing expressed by the bits iii and iv of the subscriber service information of (c) in FIG. 5 on the subscriber information table shown in FIG. 5 is added by 1 in LEN3 and LEN4 respectively (STEP S90).

After then, the contents of the telephone number changing table for storing the outline number DN3 corresponding to the extension number 1003 and the outline number DN4 corresponding to the extension number 1004 are replaced as same as FIG. 7 (STEP S91).

Furthermore, the contents of the LEN changing table of the outline numbers DN3 (777-3333) is replaced from one of DN4 (777-4444) (STEP S92). In this way, all of telephone number changing table, the LEN index table and the subscriber information table are updated, and the contents are recorded on the file memory 33 (STEP S93).

After that, the subscriber of LEN3 are connected to the tone generator 21 and the service tone, that is the notification for finishing to change (STEP S94) and processing is finished (STEP S95) at last.

As the above-described, it becomes possible to define the extension number by the subscriber in the BBG group according to the present invention. Also, it becomes possible to improve the function of the BBG because the extension number can be defined and changed by the subscriber of the BBG without the operation of the switch operator.

Accordingly, it becomes possible to steeply reduce the time which is required in switching the old number plan to the new one.

Although the present invention has been described with reference to the embodiments, the invention is not restricted to those.

It should of course be understood that those which are the same as the technical concept of the invention are within the protective scope of this invention.

What is claimed is:

1. A switch system for changing extension numbers between a plurality of telephone sets which belong to a virtual private network, the switch system comprising:

a subscriber circuit section for receiving the plurality of telephone sets;

a digital switch module connected to the subscriber circuit section for forming connections between the plurality of telephone sets; and a central processing section including:

a central processor which controls the digital switch module, a file memory having:

a telephone number changing table which stores outline numbers, each of the outline numbers being extracted by an extension number as an address, an index table which stores subscriber line position information, the subscriber line position information being extracted by an outline number as an address, and a subscriber information table which stores subscriber data, the subscriber data being extracted by the subscriber line position information as an address, wherein said central processing section changes storage locations of the outline numbers, the subscriber line position information and the subscriber data, respectively in the telephone number changing table, the index table and subscriber information table, according to changes of extension numbers.

2. The switch system according to claim 1, wherein an extension-line connection is made between the plurality of telephone sets which belong to the virtual private network under control of the central processor, when dial information inputted from a telephone set is an extension number, and the telephone set is judged as to belong to the virtual private network, by a subscriber data read out from subscriber information table corresponding to the extension number.

3. The switch system according to claim 1, wherein the central processor of the central processing section detects an access code and a new extension number, which are sent from one of the plurality of telephone sets, and allocates the new extension number detected to said one of the plurality of telephone sets by rewriting the subscriber data in the subscriber information table and an outline number in the telephone number table, wherein the subscriber data and the outline number rewritten both correspond to the one of the plurality of telephone sets.

\* \* \* \* \*